(12) United States Patent
Hu (10) Patent No.: US 8,898,334 B2
(45) Date of Patent: Nov. 25, 2014

(54) SYSTEM FOR NETWORK DEPLOYMENT AND METHOD FOR MAPPING AND DATA FORWARDING THEREOF

(75) Inventor: Fangwei Hu, Shenzhen (CN)

(73) Assignee: ZTE Corporation (CN)

( * ) Notice: Subject to any disclaimer, the term of this patent is extended or adjusted under 35 U.S.C. 154(b) by 411 days.

(21) Appl. No.: 13/383,798

(22) PCT Filed: Mar. 25, 2010

(86) PCT No.: PCT/CN2010/071299
§ 371 (c)(1),
(2), (4) Date: Jan. 12, 2012

(87) PCT Pub. No.: WO2011/006375
PCT Pub. Date: Jan. 20, 2011

(65) Prior Publication Data
US 2012/0144031 A1  Jun. 7, 2012

(30) Foreign Application Priority Data

Jul. 14, 2009  (CN) .......................... 2009 1 0158990

(51) Int. Cl.
| | | |
|---|---|---|
| G06F 15/173 | (2006.01) | |
| H04L 12/715 | (2013.01) | |
| H04L 29/08 | (2006.01) | |
| H04L 12/751 | (2013.01) | |

(52) U.S. Cl.
CPC ............... *H04L 45/04* (2013.01); *H04L 67/327* (2013.01); *H04L 45/02* (2013.01); *H04L 67/10* (2013.01)
USPC .......................................................... 709/238

(58) Field of Classification Search
CPC .................................................. H04L 12/4633
USPC ................... 709/224–227, 238–241
See application file for complete search history.

(56) References Cited

U.S. PATENT DOCUMENTS

2008/0098121 A1  4/2008  Wu

FOREIGN PATENT DOCUMENTS

| CN | 1731742 | 2/2006 |
|---|---|---|
| CN | 101378325 | 3/2009 |

OTHER PUBLICATIONS

D. Farinacci, Locator/ID Seperation Protocol (LISP) draft-farinacci-lisp-00.tx, Jan. 17, 2007, Cisco Systems,Network Working Group, pp. 1-30.*
F. Hu et al. ID/Locator Distributed Mapping Server, draft-hu-lisp-sht-00.txt, IETF Internet-Draft, Oct. 18, 2009, pp. 4-6, 8-10.

(Continued)

*Primary Examiner* — Chirag R Patel
(74) *Attorney, Agent, or Firm* — Workman Nydegger (57) ABSTRACT

The invention discloses a system for network deployment and a method for mapping and data forwarding thereof. The system for network deployment comprises Distributed Hash Table (DHT) servers and DHT border servers, wherein at least one DHT border server and one DHT server are connected to form a server ring which constitutes a distributed mapping database used for storing a mapping relationship between Endpoint Identifiers (EIDs) and Routing Locators (RLOCs), and the server rings are connected with each other through the DHT border servers, wherein the DHT border server is configured to notify the EID prefix information in a present server ring to other server rings and monitor the DHT messages of the distributed mapping database. By the present invention, the network deployment and cross-domain data forwarding based on the DHT are achieved.

2 Claims, 6 Drawing Sheets

(56) References Cited

OTHER PUBLICATIONS

D. Farinacci et al. "Locator/ID Separation Protocol (LISP), draft-ietf-lisp-00.txt", Network Working Group Internet-Draft, May 26, 2009, pp. 21, 34, 42.

International Search Report for International Application No. PCT/CN2010/071299 dated Jun. 10, 2010.

English Translation of the International Search Report for International Application No. PCT/CN2010/071299 dated Jun. 10, 2010.

* cited by examiner

SYSTEM FOR NETWORK DEPLOYMENT AND METHOD FOR MAPPING AND DATA FORWARDING THEREOF

CROSS-REFERENCE TO RELATED APPLICATIONS

This application is a U.S. Nationalization of PCT International Application No. PCT/CN2010/071299 filed 25 Mar. 2010, entitled "SYSTEM FOR NETWORK DEPLOYMENT AND METHOD FOR MAPPING AND DATA FORWARDING THEREOF", which claims priority to Chinese Patent Application No. 200910158990.0, filed 14 Jul. 2009, the contents of each of the foregoing applications are incorporated herein, in their entirety, by this reference.

FIELD OF THE INVENTION

The invention relates to the field of communications, and in particular to a system for network deployment and a method for mapping and data forwarding thereof.

BACKGROUND OF THE INVENTION

With the development of science and technology, information has become a great driving force to promote social development, and the information networks play a more and more important role in the each nation's economic and social development. However, facing the growing business needs and technical innovations, the scalability problem in the routing and address structure aspect is increasingly highlighted in the existing network: the continuous increase of network users and the development of new network technologies (such as multi-cavity technology, traffic engineering, policy routing, Virtual Private Network (VPN) and the like) cause that the scale of routing tables in a No-Default Routing Area (DFZ) is continuously increased, which has exceeded the increase of forwarding information speed of the existing router. Aiming at the problem, a new protocol, Locator Identifier Separation Protocol (LISP), is disclosed in the conventional art.

Figure 1:
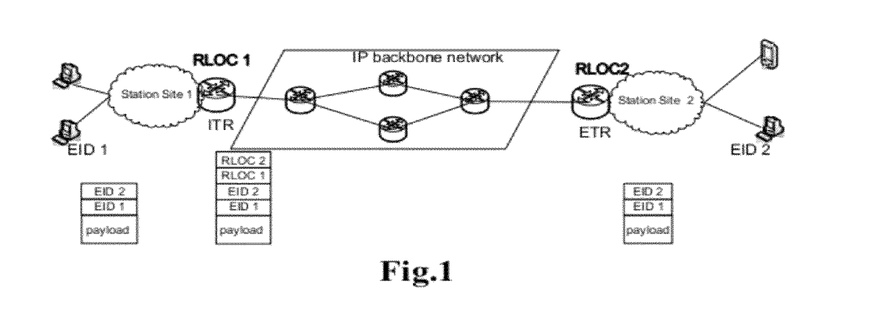
FIG. 1 is a flowchart of LISP data forwarding according to the conventional art.

The LISP divides Internet Protocol (IP) addresses into Endpoint Identifiers (EIDs) and Routing Locators (RLOCs), wherein the EID is used to identify a host device; the RLOC is used for the routing addressing and the data packet forwarding. The LISP is a map-encapsulation scheme, which adopts an "IP-IN-IP" method to implement the encapsulation and additionally encapsulates a layer of IP packet header outside the common IP packets. The source IP address field and the destination IP address field of an inner IP header are represented by a source EID and a destination EID respectively, and the source IP address field and the destination IP address field of an outer IP header are represented by a source RLOC and a destination RLOC respectively. The packets only need to be implemented with routing addressing and forwarding according to the destination RLOC of the outer IP packet header during the network transfer process, and the inner IP packet header keeps unchanged during the transfer process. FIG. 1 illustrates a data forwarding process of LISP, wherein the border router is called as a Tunnel Router (TR), the communication initiator is called as an Ingress Tunnel Router (ITR), and the receiving party is called as an Egress Tunnel Router (ETR). When a host in the border of the ITR router initiates a communication, the source address and the destination address are all the IP addresses (EIDs) of the terminal host. The ITR searches the RLOC address of the ETR router corresponding to the obtained destination EID when receiving the information, and encapsulates the original packets in the tunnel packets, wherein the source address and destination address in the tunnel packet header are the RLOC of the ITR and the RLOC of the ETR. After the packets arrive at the ETR, the ETR decapsulates the outer tunnel packet header, and forwards the decapsulated packets to a destination host in a local station site according to the destination EID.

For the control plane, a method for establishing EID-to-RLOC mapping based on Distributed Hash Table (DHT) is provided in the conventional art. However, how to implement the network deployment, and in particular the cross-domain data forwarding, which is no corresponding solution temporarily.

SUMMARY OF THE INVENTION

The invention is provided aiming at the problem that there is no corresponding solution of how to implement network deployment based on the DHT, and in particular the cross-domain data forwarding, therefore, the main purpose of the invention is to provide a system for network deployment and a method for mapping and data forwarding thereof, in order to solve at least one of the problems.

In order to achieve the purpose, according to one aspect of the invention, a system for network deployment is provided, which comprising: DHT servers and DHT border servers, wherein at least one DHT border server and one DHT server are connected to form a server ring which constitutes a distributed mapping database used for storing a mapping relationship between EIDs and RLOCs, and the server rings are connected with each other through the DHT border servers, wherein the DHT border server is configured to notify the information in a present sever ring to other server rings and monitor DHT messages of the distributed mapping database.

Furthermore, the DHT border server still comprises: a decapsulation module, configured to decapsulate an encapsulated packet coming from an ITR in a present domain and forward the decapsulated packet to DHT border servers in other domains.

Furthermore, the DHT border server still comprises an encapsulation module, configured to encapsulate packets coming from the DHT border servers in other domains and forward the encapsulated packets to an ETR in the present domain.

In order to achieve the purpose, according to another aspect of the invention, a method for identifier and locator mapping is provided, which comprising: a DHT server receiving EID information from a ETR in a present domain; the DHT server storing mapping relationships EIDs and RLOCs to a distributed mapping database based on a DHT algorithm, wherein the distributed mapping database is a server ring formed by connecting at least one DHT border server with one DHT server; the DHT border server converging newly-registered EID information with EID information stored in the distributed mapping database when the newly-registered EID information has been monitored; and the DHT border server notifying the prefix information of the converged EID to DHT border servers in other domains.

In order to achieve the purpose, according to another aspect of the invention, a method for data forwarding is provided, which comprising: an Ingress Tunnel Router (ITR) of the first domain receiving an Internet Protocol (IP) packet from a first host of a first domain; the ITR determining whether the IP packet is an initial packet, and if the determination result is NOT, encapsulating the IP packet; the ITR forwarding the encapsulated IP packet to a Distributed Hash Table (DHT) border server of the first domain; the DHT border server of the first domain decapsulating the encapsulated IP packet, and forwarding the decapsulated IP packet to a DHT border server of a second domain; the DHT border server of the second domain encapsulating the received decapsulated IP packet, and forwarding the IP packet encapsulated by the DHT border server of the second domain to an Egress Tunnel Router (ETR) of the second domain; and the ETR of the second domain decapsulating the IP packet encapsulated by the DHT border server of the second domain, and forwarding the decapsulated IP packet to a second host of the second domain.

Furthermore, after the ITR determines whether the IP packet is an initial packet, the method further comprising: if the determination result is YES, taking the Routing Locator (RLOC) address of the DHT border server as the RLOC address corresponding to the Endpoint Identifier (EID) in the IP packet, and storing the mapping relationship in the IP packet between the EID and the RLOC address to the local memory of the ITR.

By the invention, the distributed mapping database is a server ring which is formed by connecting at least one DHT border server and one DHT server, wherein the distributed mapping database is used for storing the mapping relationship between the EID and the RLOC and the server rings are connected with each other through the DHT border server, which solving the problem of how to implement network deployment based on the DHT, and in particular that there is no corresponding solution for cross-domain data forwarding, thereby achieving the effect of network deployment and cross-domain data forwarding based on the DHT.

BRIEF DESCRIPTION OF THE DRAWINGS

The drawings illustrated herein provide a further understanding of the present invention and form a part of the present application. The exemplary embodiments and description thereof are used to explain the present invention without unduly limiting the scope of the present invention. In the drawings.

DETAILED DESCRIPTION OF THE EMBODIMENTS

A detailed description is given to the present invention with reference to the accompanying drawings and embodiments. It should be noted that the embodiments in the present application and the characteristics in the embodiments can be combined mutually in the case of no conflict.

The embodiment of the present invention provides a system for network deployment and a method for mapping and data forwarding thereof. The system for network deployment comprises Distributed Hash Table (DHT) servers and DHT border servers, wherein at least one DHT border server and one DHT server are connected to form a server ring which constitutes a distributed mapping database used for storing a mapping relationship between Endpoint Identifiers (EIDs) and Routing Locators (RLOCs), and the server rings are connected with each other through the DHT border servers, wherein the DHT border server is configured to notify the EID prefix information in the present server ring to other server rings and to monitor the DHT messages of the distributed mapping database.

The embodiment of the present invention provides a method for identifier and locator mapping which comprises: a DHT server receiving the EID information from a present-domain Egress Tunnel Router (ETR); the DHT server storing the mapping relationship between the EID and the RLOC to a distributed mapping database by a DHT algorithm, wherein the distributed mapping database is a server ring which is formed by connecting at least one DHT border server and one DHT server; the DHT border server converging newly-registered EID information with the EID information stored in the distributed mapping database when the newly-registered EID information has been monitored; and the DHT border server notifying the prefix information of the converged EID to the DHT border servers in other domains.

The method for data forwarding comprises: an Ingress Tunnel Router (ITR) of a first domain receiving an IP packet from a first host of the first domain; the ITR determining whether the IP packet is an initial packet, and if the determination result is NOT, encapsulating the IP packet; the ITR forwarding the encapsulated IP packet to a DHT border server of the first domain; the DHT border server of the first domain decapsulating the encapsulated IP packet, and forwarding the decapsulated IP packet to a DHT border server of the second domain; the DHT border server of the second domain encapsulating the received decapsulated IP packet, and forwarding the IP packet encapsulated by the DHT border server of the second domain to the ETR of the second domain; and the ETR of the second domain decapsulating the IP packet encapsulated by the DHT border server of the second domain, and forwarding the decapsulated IP packet to the second host of the second domain.

It should be noted that the embodiments in the present application and the characteristics in the embodiments can be combined mutually in the case of no conflict. The present invention is described below with reference to the accompanying drawings and embodiments in detail.

Apparatus Embodiment

Figure 2:
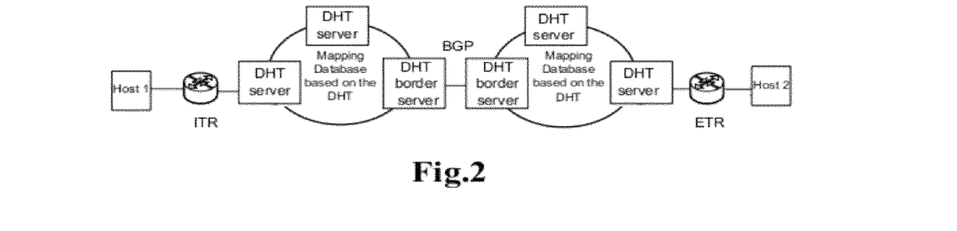
FIG. 2 is a system structural block diagram of network deployment of a cross-domain distributed mapping database according to one embodiment of the present invention.

FIG. 2 is a system structural block diagram of network deployment of a cross-domain distributed mapping database according to one embodiment of the present invention, wherein there is a server ring in the left side and in the right side respectively formed by connecting DHT servers (namely Distributed Hash Table servers) with a DHT border server (namely Distributed Hash Table border server). The server ring constitutes a distributed database used for storing the mapping relationship between the EIDs and the RLOCs in a storage domain. Two server rings are connected by DHT border servers. The BGP protocol is executed between the DHT border servers to establish an equivalence relationship of an Outer Border Gateway Protocol (eBGP), and the DHT border server notifies the present-domain converged EID prefix information to the other domain.

Figure 3A:
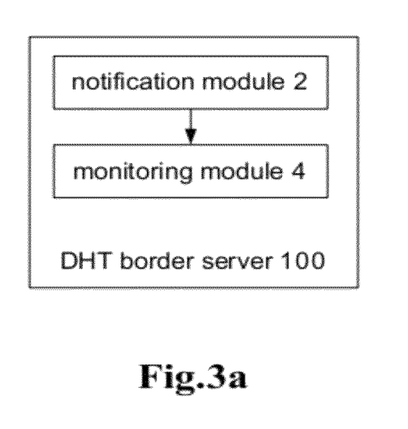
FIG. 3a is a schematic diagram I of a preferential Distributed Hash Table border server according to one embodiment of the present invention.
Figure 3B:
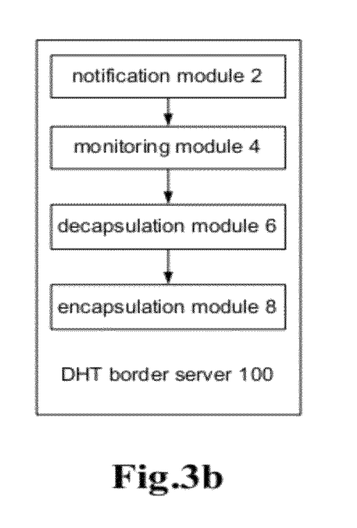
FIG. 3b is a schematic diagram II of a preferential Distributed Hash Table border server according to one embodiment of the present invention.

FIG. 3a is a schematic diagram I of a preferential Distributed Hash Table border server according to one embodiment of the present invention. The DHT border server comprises a notification module 2 and a monitoring module 4, wherein the notification module 2 is configured to notify the EID prefix information to DHT border servers in other domains, and the monitoring module 4, coupled to the monitoring module 2, is configured to monitor the DHT messages in the distributed mapping database. FIG. 3b is a schematic diagram II of a preferential Distributed Hash Table border server according to one embodiment of the present invention. The DHT border server further comprises a decapsulation module 6 and an encapsulation module 8, wherein the decapsulation module 6 is configured to decapsulate an encapsulated packet coming from an ITR in the present domain and forward the decapsulated packet to DHT border servers in other domains; and the encapsulation module 8 is configured to encapsulate packets coming from DHT border servers in other domains and forward the encapsulated packets to an ETR in the present domain.

Method Embodiment

The embodiment of the invention provides a cross-domain network structure based on the DHT, which introduces a DHT border server device implementing cross-domain routing notification and cross-domain data packets encapsulation and forwarding.

Figure 4:
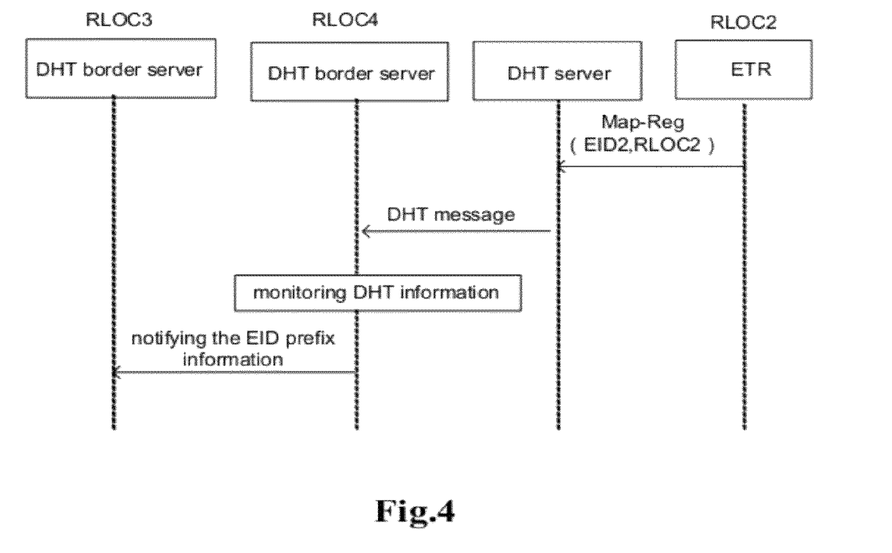
FIG. 4 is a schematic diagram of cross-domain identifier and locator mapping according to one embodiment of the present invention.

FIG. 4 is a schematic diagram of the cross-domain Identifier and Locator mapping (namely, the distribution process of the EID prefix information) according to one embodiment of the present invention. When the ETR has a new registration message, the ETR will send the EID registration message to the DHT server. The DHT server, after receiving the registration message, stores the mapping relationship between the EID and the RLOC to the distributed mapping database based on a DHT algorithm, and then the DHT border server monitors the DHT message on a DHT ring, wherein when there is a new EID having been monitored, the DHT border server will converge the new EID with the local EID prefix and notify the converged EID prefix to DHT border server devices in other-domains through the BGP routing protocol.
For inter-domain communication, since two communication parties are not in a same domain, and the EID mapping information of two hosts is stored in different overlay planes, thus the inter-domain communication needs to be completed by the DHT border server.

Figure 5:
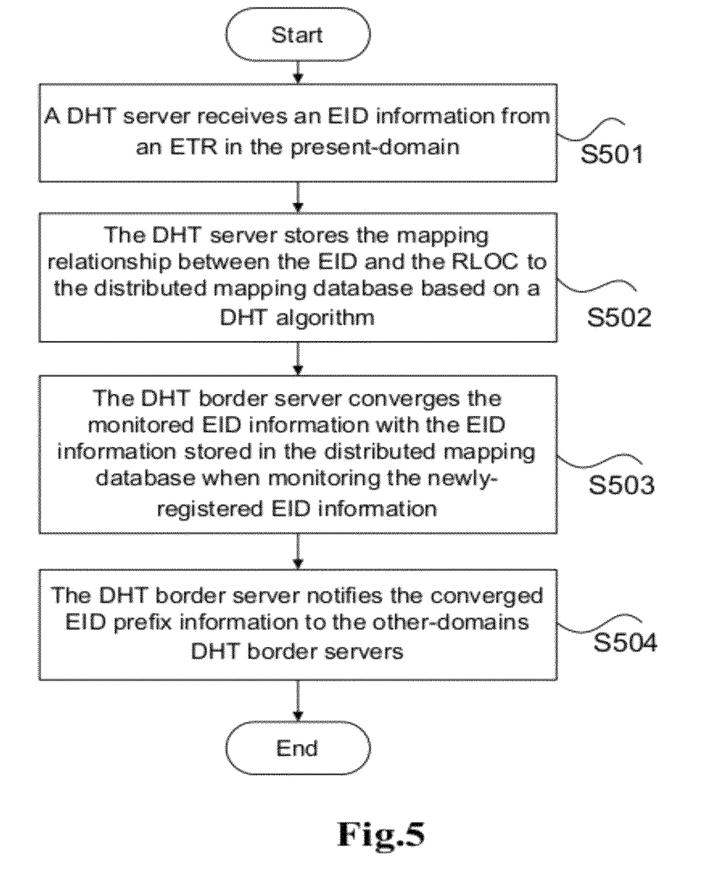
FIG. 5 is a flowchart of cross-domain identifier and locator separation mapping according to one embodiment of the present invention.

FIG. 5 is a flowchart of the cross-domain Identifier and Locator mapping according to one embodiment of the present invention. The description of distribution process of the inter-domain EID prefix information is as follows: the method comprises the following steps of Step S501 to Step S504.
Step S501, the DHT server receives an EID information from an ETR in the present-domain;
Step S502, the DHT server stores the mapping relationship between the EID and the RLOC to the distributed mapping database based on a DHT algorithm, wherein the distributed mapping database is a server ring which is formed by at least one DHT border server and one DHT server;
Step S503, the DHT border server converges the monitored EID information with the EID information stored in the distributed mapping database when monitoring the newly-registered EID information;

Step S504, the DHT border server notifies the converged EID prefix information to the other-domains DHT border servers.

Figure 6:
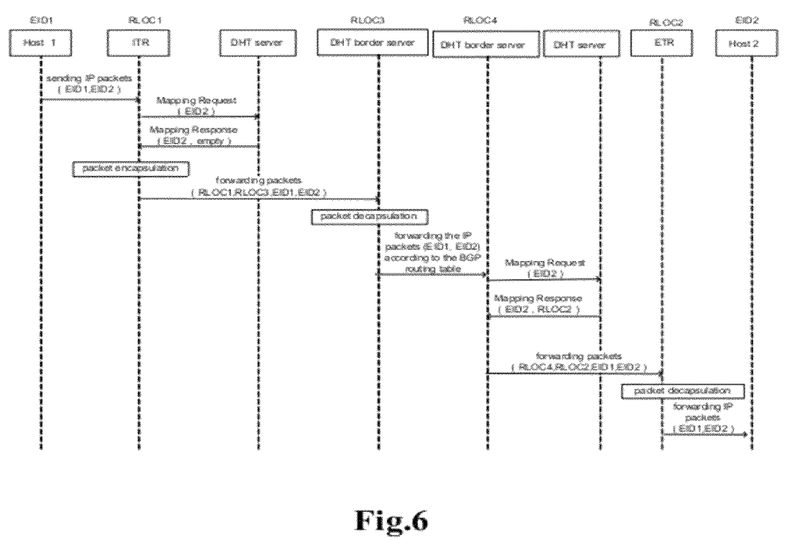
FIG. 6 is a schematic diagram of cross-domain data forwarding process according to one embodiment of the present invention.
Figure 7:
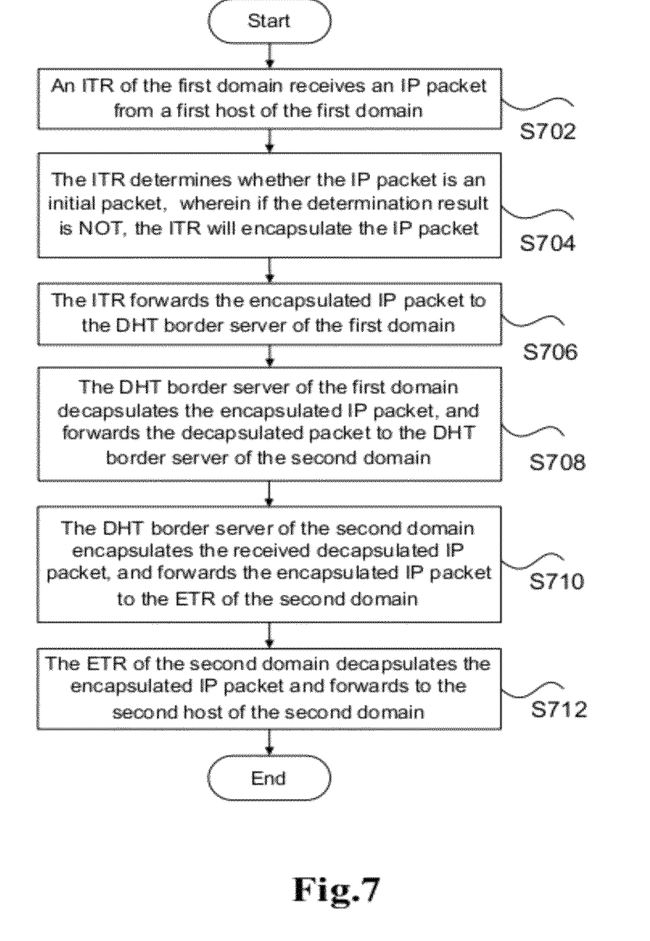
FIG. 7 is a flowchart of cross-domain data forwarding according to one embodiment of the present invention.

FIG. 6 is a schematic diagram of cross-domain data forwarding according to one embodiment of the present invention. FIG. 7 is a flowchart of cross-domain data forwarding according to one embodiment of the present invention. The method comprises the following steps of Step S702 to Step S712.

Step S702, an ITR of the first domain receives an IP packet from a first host of the first domain, wherein the IP packet may be an IPv4 or an IPv6 packet, the destination address of the IP packet is the EID address of the host 2, and the source IP address of the IP packet is the EID address of the host 1. The ITR, after receiving the IP packet, searches in the local cache for an RLOC corresponding to an EID2, wherein if a related mapping record can be found, it is indicated that the packet is not an initial packet, and the attribute in the mapping relationship is displayed as an inter-domain communication;

Step S704, the ITR determines whether the IP packet is an initial packet. wherein if the determination result is NOT, the ITR will encapsulate the IP packet, namely, the ITR will additionally encapsulate an layer of IP packet header outside the IP packet header, wherein the destination IP address in the outer IP packet header is the RLOC address of the DHT border server and the source IP address is the RLOC address of the ITR;

Step S706, the ITR performs routing for the encapsulated IP packet according to the destination RLOC in the outer IP packet header, and forwards the packet to the DHT border server of the first domain;

Step S708, the DHT border server of the first domain decapsulates the encapsulated IP packet, and forwards the decapsulated packet to the DHT border server of the second domain. In particular, the data packet achieves the DHT border server, performs decapsulation on the DHT border server by decapsulating the outer IP packet header, and searches the destination EID address which is matched with the BGP routing table, and then forwards the decapsulated packet to the DHT border server of the domain in which the host 2 is located according to the destination EID;

Step S710, the DHT border server of the second domain encapsulates the received decapsulated IP packet, and forwards the encapsulated IP packet to the ETR of the second domain. In particular, the RLOC information corresponding to the EID2 is to be searched on the DHT border server, after the RLOC information is found, the IP packet encapsulation will be performed again, wherein the source IP address and the destination address of the outer IP packet header are the RLOC address of the DHT border server and the RLOC corresponding to the EID of the host 2 respectively, and the inner IP packet header maintains unchanged, and then the DHT border server performs routing according to the RLOC encapsulated in the outer IP packet and forwards to the ETR of the second domain;

Step S712, the ETR of the second domain decapsulates the encapsulated IP packet and forwards to the second host of the second domain, and in particular, decapsulates the packet on the ETR by decapsulating the outer IP packet header, performs routing for the IP packet according to the destination EID, and forwards to the destination host 2.

Preferably, in the Step S704, if the determination result is NOT, the ITR will encapsulate the LISP-Request packet and send the LISP-Request packet to the DHT server to request the RLOC address of EID2; the DHT server, after receiving the LISP-Request packet, searches the RLOC information corresponding to the EID in the distributed database by the DHT algorithm, and since EID is outside-domain EID information, the mapping corresponding to the EID will not be found in an present-domain overlay mapping database, so encapsulating an LISP-Reply response packet, in which the RLOC information is empty; the ITR, after receiving the LISP-Reply response packet and finding that the RLOC information is empty, then determine there is an inter-domain communication, takes the RLOC address of the DHT border server as the RLOC corresponding to the EID, and stores the mapping relationship, marked as an outer-domain EID information, to a local cache.

By the above descriptions, it is can be seen that the present invention can realize the network deployment and cross-domain data forwarding based on the DHT.

The descriptions above are only preferential embodiments of the present invention, which are not used to limit the present invention. For those skilled in the art, the present invention may have various changes and variations. Any the modification, equivalent substitution and improvement within the spirit and principle of the present invention can be all included in the scope of the claims of the present invention.

What is claimed is:

1. A method for data forwarding, comprising:

an Ingress Tunnel Router (ITR) of the first domain receiving an Internet Protocol (IP) packet from a first host of a first domain;

the ITR determining whether the IP packet is an initial packet, and if the determination result is NOT, encapsulating the IP packet;

the ITR forwarding the encapsulated IP packet to a Distributed Hash Table (DHT) border server of the first domain;

the DHT border server of the first domain decapsulating the encapsulated IP packet, and forwarding the decapsulated IP packet to a DHT border server of a second domain;

the DHT border server of the second domain encapsulating the received decapsulated IP packet, and forwarding the IP packet encapsulated by the DHT border server of the second domain to an Egress Tunnel Router (ETR) of the second domain; and the ETR of the second domain decapsulating the IP packet encapsulated by the DHT border server of the second domain, and forwarding the decapsulated IP packet to a second host of the second domain.

2. The method according to claim 1, wherein after the ITR determines whether the IP packet is an initial packet, the method further comprising:

if the determination result is YES, taking the Routing Locator (RLOC) address of the DHT border server as the RLOC address corresponding to the Endpoint Identifier (EID) in the IP packet, and storing the mapping relationship in the IP packet between the EID and the RLOC address to the local memory of the ITR.

* * * * *